US012603836B2

(12) United States Patent
Vafai et al.

(10) Patent No.: US 12,603,836 B2
(45) Date of Patent: Apr. 14, 2026

(54) ROUTING POLICIES WITH ROUTING CONTROL FUNCTIONS (RCFs) HAVING FUNCTION ARGUMENTS

(71) Applicant: Arista Networks, Inc., Santa Clara, CA (US)

(72) Inventors: Keon M Vafai, Milpitas, CA (US); Sharad Birmiwal, Burnaby (CA); David Cronin, Dublin (IE)

(73) Assignee: ARISTA NETWORKS, INC., Santa Clara, CA (US)

( * ) Notice: Subject to any disclaimer, the term of this patent is extended or adjusted under 35 U.S.C. 154(b) by 356 days.

(21) Appl. No.: 18/365,131

(22) Filed: Aug. 3, 2023

(65) Prior Publication Data

US 2025/0047593 A1    Feb. 6, 2025

(51) Int. Cl.
*H04L 45/302* (2022.01)

(52) U.S. Cl.
CPC .................................. *H04L 45/306* (2013.01)

(58) Field of Classification Search
CPC ............................. H04L 45/033; H04L 45/306
See application file for complete search history.

(56) References Cited

U.S. PATENT DOCUMENTS

| | | | |
|---|---|---|---|
| 2019/0258754 A1* | 8/2019 | Minwalla | .............. H04L 41/145 |
| 2020/0007404 A1* | 1/2020 | Pinheiro | ............. G06F 9/45508 |
| 2021/0399978 A9* | 12/2021 | Michael | .............. H04L 43/0876 |
| 2024/0430203 A1* | 12/2024 | Smith | ..................... H04L 47/17 |

* cited by examiner

*Primary Examiner* — Donald L Mills

(74) *Attorney, Agent, or Firm* — Fountainhead Law Group, PC

(57) ABSTRACT

A network device uses a routing policy to assess network routes, such as BGP routes. The routes can be routes advertised by neighbors to be programmed in a routing table of the network device. The network routes can be previously programmed routes (e.g., in a routing table) in the network device to be advertised to its neighbors. The routing policy includes routing control functions (RCF functions) for assessing a network route. An RCF function can be invoked with arguments, which allows the user to deploy some common logic (e.g., matching a community list, modifying a local preference value, etc.) with different sets of input values without having to write separate functions for each set of input values.

Figure 3:
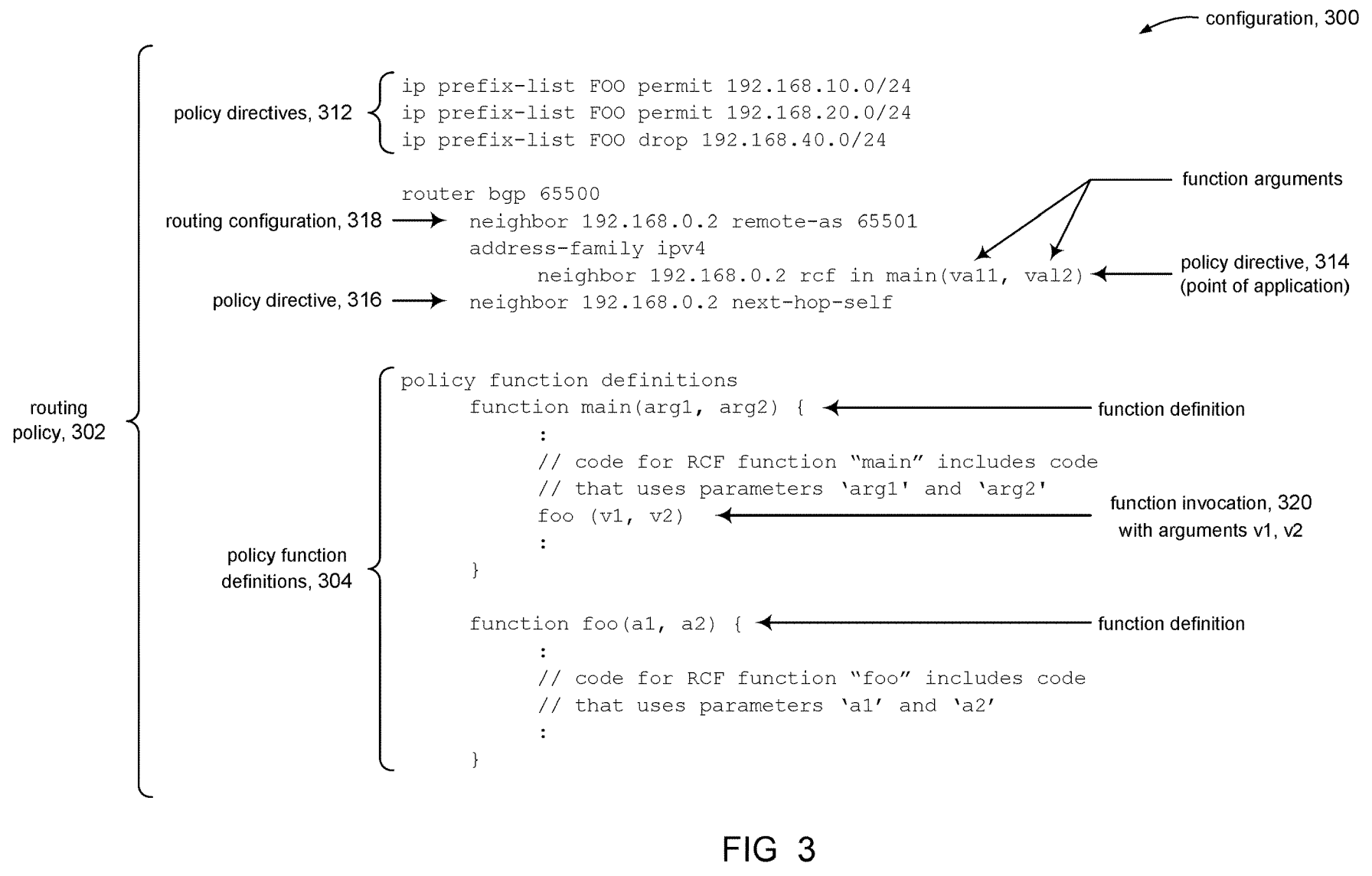

20 Claims, 9 Drawing Sheets configuration, 300 function arguments policy directive, 314
(point of application)

function definition function invocation, 320
with arguments v1, v2 function definition

```
                      ip prefix-list FOO permit 192.168.10.0/24
                      ip prefix-list FOO permit 192.168.20.0/24
                      ip prefix-list FOO drop 192.168.40.0/24 router bgp 65500
                        neighbor 192.168.0.2 remote-as 65501
                        address-family ipv4
                          neighbor 192.168.0.2 rcf in main(val1, val2)
                          neighbor 192.168.0.2 next-hop-self policy function definitions
      function main(arg1, arg2) {
        ..
         // code for RCF function "main" includes code
         // that uses parameters 'arg1' and 'arg2'
         foo (v1, v2)
        ..
      }
      function foo(a1, a2) {
        ..
         // code for RCF function "foo" includes code
         // that uses parameters 'a1' and 'a2'
        ..
      }
``` policy directives, 312 routing configuration, 318 policy directive, 316 policy function
definitions, 304 routing
policy, 302

FIG 3 policy function definitions, 400 function arguments invocation, 402 invocation, 404

```
function main_rcf() {
  if igp.tag > 100
    return rcf_helper( 20, C_LIST_FOR_BIG_TAG );
  else
    return rcf_helper( 30, C_LIST_FOR_SMALL_TAG );
} function rcf_helper( IntType $pref_to_set, CommListType $clist_name ) {
  local_preference = $pref_to_set;
  return community match community_list $clist_name;
}
```

ROUTING POLICIES WITH ROUTING CONTROL FUNCTIONS (RCFs) HAVING FUNCTION ARGUMENTS

CROSS REFERENCE TO RELATED APPLICATIONS

The present disclosure relates to commonly owned U.S. Pub. No. US 2023/0038824, entitled "Efficient Runtime Evaluation Representation, External Construct Late-binding, and Updating Mechanisms For Routing Policies," filed Aug. 3, 2021, and is incorporated herein by reference in its entirety for all purposes.

BACKGROUND

Routing policies in a network device (e.g., switch, router, etc.) can specify which routes and how those routes are programmed into the device's routing tables. Users can create routing policies with technologies such as route-maps and RCFs (Routing Control Functions) to implement granular network controls. RCF is a tool that allows the user to programmatically define policy functions to evaluate routes.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 is an illustrative example of a policy configuration in accordance with some embodiments.

DETAILED DESCRIPTION

The present disclosure is directed to a Routing Control Function (RCF) programming language used in routing policies. Function arguments can be provided when an RCF function is invoked at the point of application in the routing policy. Function arguments can also be provided when making a function call to another RCF function within an RCF function. Passing arguments into an RCF function allows the user to deploy some common logic (e.g., matching a community list, modifying a local preference value, etc.) with different sets of input values without having to write separate functions for each set of input values. For example, instead of writing a function that is hardcoded with a first set of values to process the first set of values, a second identical function that is hardcoded with a second set of values to process the second set of values, a third identical function that is hardcoded with a third set of values to process the third set of values, and so on, a single function with parameters can defined. The function can then be invoked with the first set of values as arguments to the function to process the first set of values. The same function can be invoked with the second set of values as arguments to the function to process the second set of values, and so on.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
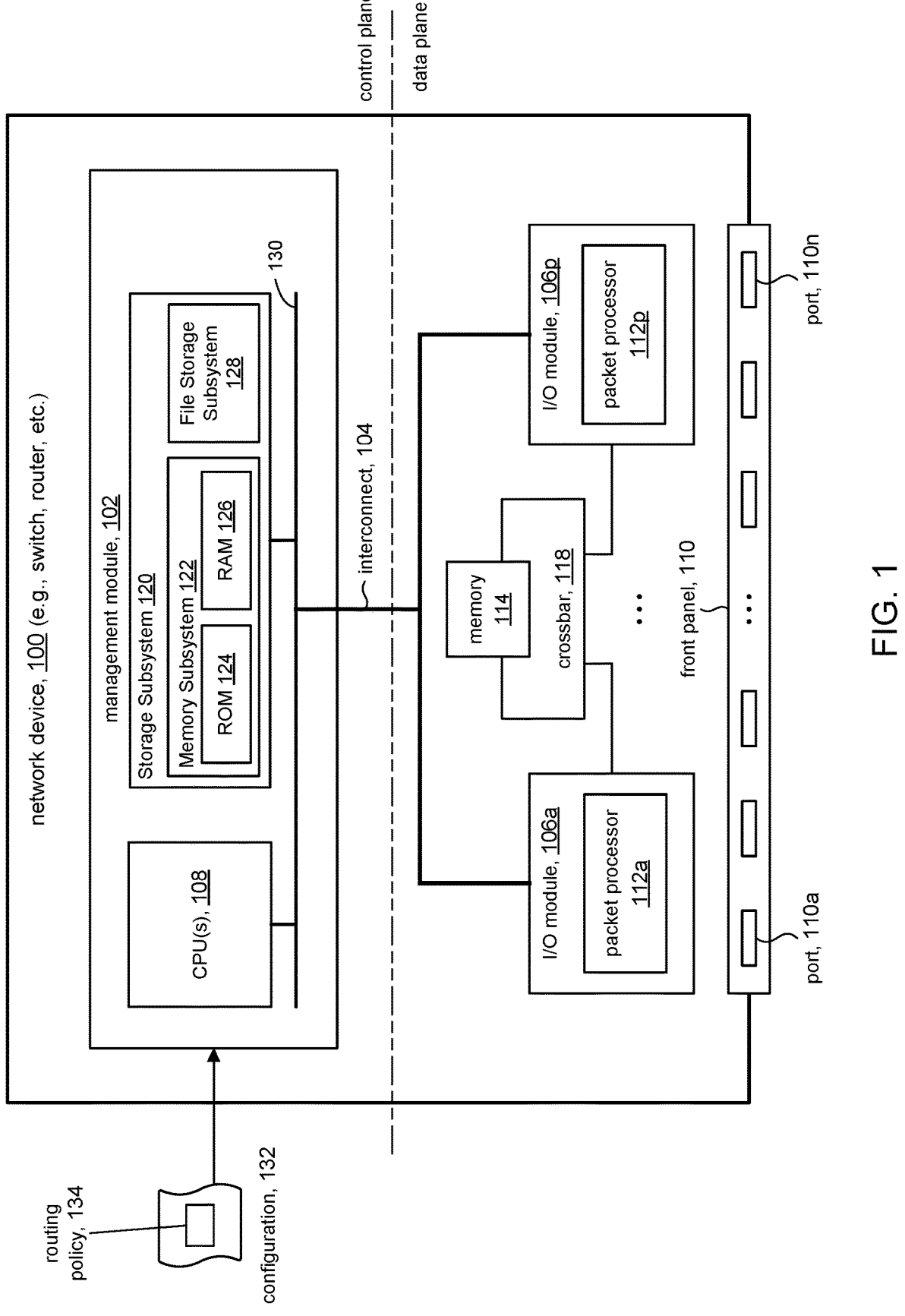
FIG. 1 is a high level representation of a network device in accordance with the present disclosure.

FIG. 1 is a schematic representation of a network device 100 (e.g., a router, switch, firewall, and the like) that can be adapted in accordance with the present disclosure. In some embodiments, for example, network device 100 can include a management module 102, one or more I/O modules (switches, switch chips) 106a-106p, and a front panel 110 of I/O ports (physical interfaces, I/Fs) 110a-110n. Management module 102 can constitute the control plane of network device 100 (also referred to as a control layer or simply the CPU), and can include one or more management CPUs 108 for managing and controlling operation of network device 100 in accordance with the present disclosure. Each management CPU 108 can be a general-purpose processor, such as an Intel®/AMD® x86, ARM® microprocessor and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be a PCIe (Peripheral Component Interconnect Express) bus or any other suitable bus architecture (e.g., SMBus (System Management Bus), I2C (Inter-Integrated Circuit), etc.).

I/O modules 106a-106p can include respective packet processing hardware comprising packet processors 112a-112p to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an ASIC (application specific integrated circuit), FPGA (field programmable array), processing unit, and the like, which can be configured to operate in accordance with the present disclosure. Packet processors 112a-112p can include forwarding lookup hardware such as, for example, but not limited to content addressable memory such as TCAMs (ternary CAMs) and auxiliary memory such as SRAMs (static RAM).

Memory hardware 114 can include the buffers used for queueing packets. I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Configuration 132 can be provided to network device 100 to configure various aspects of the network device; e.g., which users can log into the device, DNS (directory name server) configuration, protocol configuration, hardware configuration, and so on. In some embodiments, configuration 132 can include routing policy 134 which represents an organization's policy for how network routes (network paths) are to be treated in the organization within which the network device is deployed; e.g., determine egress interface, VLAN tag manipulation, VxLAN encapsulation, etc.

Figure 2:
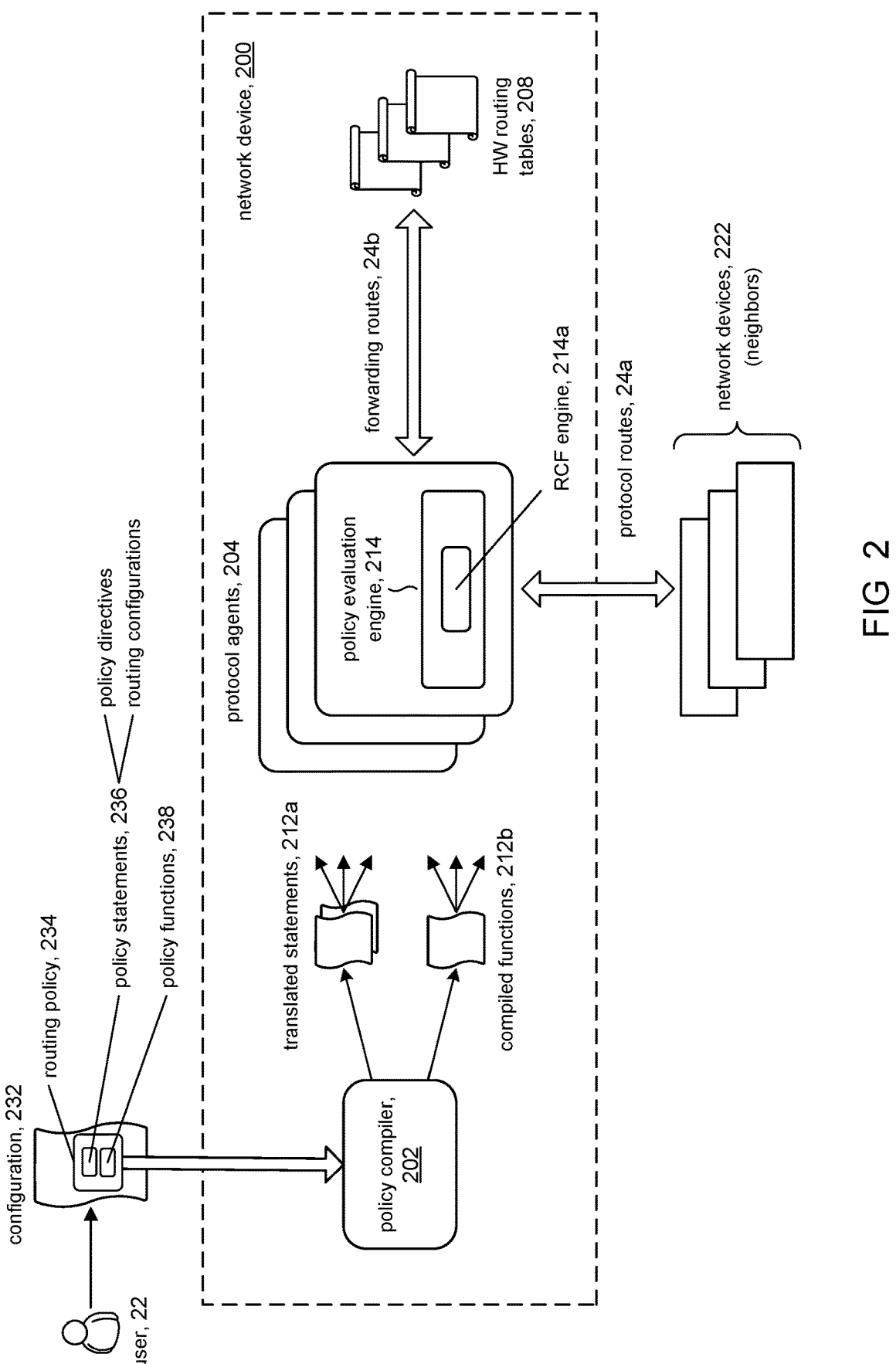
FIG. 2 illustrates policy processing elements in a network device in accordance with some embodiments.

FIG. 2 is a generalized schematic representation of a workflow in a network device for processing routes in accordance with the present disclosure. In some embodiments, for example, network device 200 can include policy compiler 202 to process a routing policy 234. A routing policy is used to assess or otherwise evaluate routing information (routes, paths) that are exchanged among network devices in a network. Examples used in the present disclosure refer to BGP (Border Gateway Protocol) which is a gateway protocol used to exchange routing information. It will be appreciated, however, that the present disclosure can be adapted for use with other routing protocols, for example, OSPF (Open Shortest Path First). The routing policy can be defined by a network administrator and is used to assess which BGP routes received from neighbor devices can be imported into the routing table(s) of a network device, and which BGP routes can be exported from the network device to neighbor devices.

In accordance with some embodiments, a routing policy 234 can include functions defined using the RCF programming language. Routing policy 234 can be contained in configuration file 232 which, for example, can be provided by a user 22, a centralized network controller, etc. Policy compiler 202 can include one or more components to compile or otherwise translate the user-readable text that constitutes routing policy 234 to a suitable internal representation that the network device can execute. A policy compiler in accordance with some embodiments is disclosed in commonly owned U.S. Pub. No. US 2023/0038824, entitled "Efficient Runtime Evaluation Representation, External Construct Late-binding, and Updating Mechanisms For Routing Policies," which is incorporated herein by reference for all purposes. Routing policy 234 can include routing policy statements 236 (e.g., policy directives, routing configurations, etc.) and routing control functions (referred to herein as policy functions) 238. In some embodiments, policy compiler 202 can include a translator to produce a suitable internal representation of the human-readable policy statements 236, generically represented in FIG. 2 as translated statements 212a, which can be executed by the network device.

In accordance with some embodiments, policy functions 238 can be written in the RCF programming language. Users (e.g., network or system administrators) can write policy functions that express and evaluate policies such as route filtering and attribute modification in a programmatic fashion to facilitate processing of routes. Policy compiler 202 can include a compiler to produce a suitable internal representation of policy functions 238, represented in FIG. 2 as compiled functions 212b (e.g., evaluation trees).

Network device 200 can include protocol agents 204 (e.g., spanning tree protocol, address resolution protocol, boundary gateway protocol, etc.) that communicate with other network devices 222 (neighbors, peers, etc.) to exchange (import and export) protocol routes 24a. Protocol agents 204 can execute the translated statements 212a and compiled functions 212b to assess or otherwise evaluate protocol routes 24a received from BGP neighbors 222 to be programmed (imported) in the hardware routing tables 208 of the network device. Conversely, the protocol agents 204 can assess forwarding routes stored in the hardware routing tables 208 to be advertised (exported) to BGP neighbors 222. Hardware routing tables 208 can comprise any suitable persistent memory, such as TCAMs, SRAMs, etc.

Each policy agent 204 can include a policy evaluation engine 214. During processing of a received route 24a, 24b, the translated statements 212a and compiled functions 212b that constitute the routing policy are executed by the policy evaluation engine 214 to determine whether to accept (import) the received route or advertise (export) the received route. For example, routes 24a received from a neighbor device 222 can be assessed to determine if the received route is allowed to be imported (e.g., programmed) in a forwarding table of network device 200. Conversely, a route 24b in a forwarding table of the network device can be assessed to determine if the route can be exported (e.g. advertised) to neighbor devices 222. Policy evaluation engine 214 can create or otherwise represent an execution environment within which to execute the translated statements and compiled functions.

In accordance with some embodiments, the policy evaluation engine 214 can include or otherwise instantiate an RCF engine 214a that creates or otherwise represents an RCF execution environment for executing compiled functions 212b. The nature of the RCF execution environment depends on the nature of the particular implementation of RCF. In some embodiments, for example, RCF can be an interpreted language, not unlike the BASIC programming language, and RCF engine 214a can be an interpreter that interprets human-readable policy functions directly without compiling the functions. In other embodiments, RCF can be a partially compiled language. For example, policy functions can be compiled into an intermediate representation (e.g., bytecode) and RCF engine 214a can be an interpreter that interprets the intermediate representation. In some embodiments, the internal representation can be expressed as an evaluation tree, such as disclosed in commonly owned U.S. Pub. No. US 2023/0038824. In other embodiments, RCF can be compiled into binary code and RCF engine 214a can be a virtual machine that executes the binary code.

FIG. 3 shows a portion of a configuration 300 that includes a simplified example of a BGP routing policy 302 in accordance with some embodiments. The routing policy 302 can comprise policy statements such as policy directives 312, 314, 316, routing configuration 318, and the like. As can be seen in FIG. 3, the policy directive 314 invokes a policy function called MAIN( ). A policy directive (e.g., 314) that invokes a policy function can be referred to as the "point of application" of the policy function. When policy function MAIN( ) is encountered at a point of application during execution (evaluation) of routing policy 302, the policy function is invoked and processing of the routing policy continues within the policy function; in other words execution transfers to the policy function. When execution of MAIN(completes, processing can resume at the point in the routing policy that follows the point of application 314 (i.e., execution transfers to the point in the routing policy that follows the point of application), which in the example in FIG. 3 is policy directive 316.

Routing policy 302 can include a policy function definition section 304 comprising definitions of policy functions, which in the example in FIG. 3 includes function definitions for MAIN( ) and FOO( ). In accordance with the present disclosure, policy functions can be defined with function parameters. Function parameters provide a mechanism for receiving values (e.g., numbers, strings, data structures, etc.) when the function is invoked. Policy function MAIN( ), for example, is defined with two function ARG1 and ARG2. The code definition for MAIN(may include code that uses these parameters. FIG. 3 shows that at the point of application, policy function MAIN( ) is invoked with two arguments VAL1 and VAL2 that are passed to the policy function. When execution transfers to policy function MAIN( ), the function parameters ARG1 and ARG2 take on the values of arguments VAL1 and VAL2, respectively.

Further in accordance with the present disclosure, policy functions called from within another policy function can be invoked with arguments. Policy function FOO( ), for example, is defined with function parameters A1 and A2. Policy function FOO( ) is invoked 320 from within policy function MAIN( ) with arguments V1, V1. When execution transfers to policy function FOO( ), the function parameters A1 and A2 take on the values of arguments v1 and v2, respectively.

Figure 4:
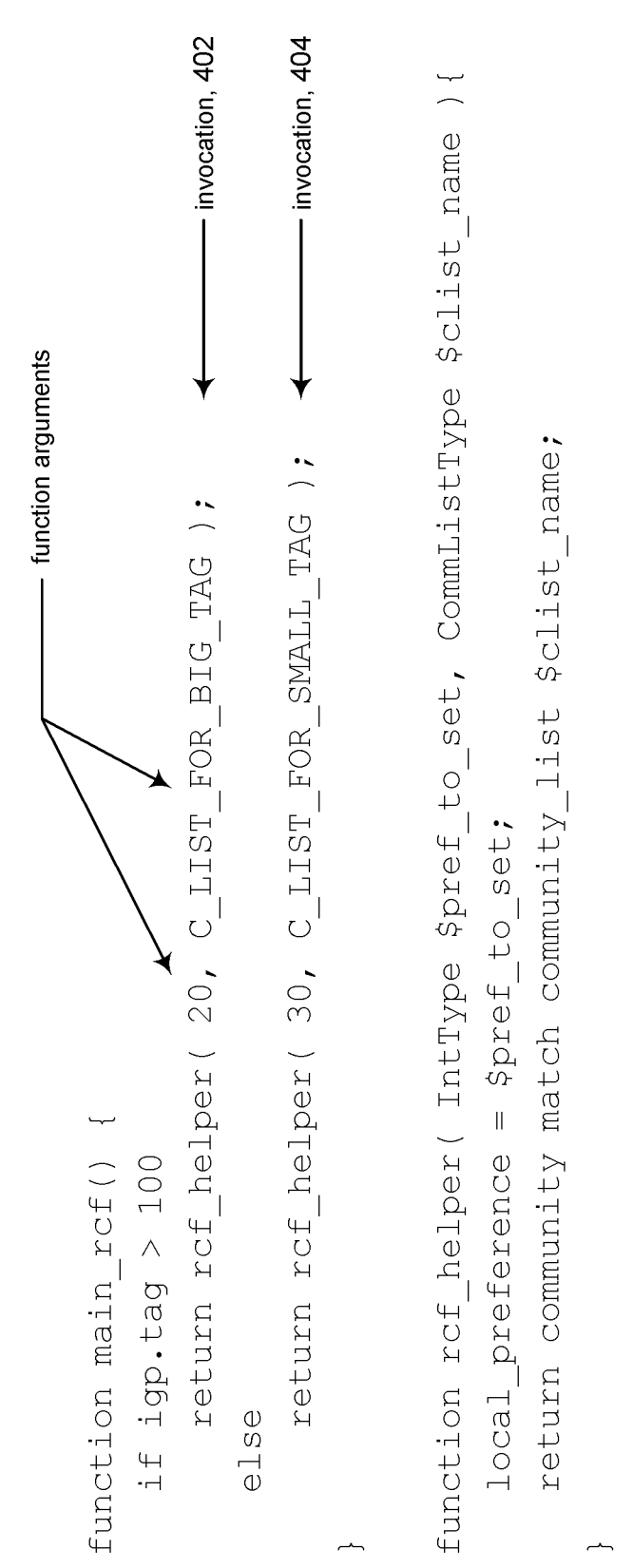
FIG. 4 is an illustrative example of a policy function in accordance with some embodiments.

FIG. 4 shows illustrative examples of policy function definitions 400 for assessing BGP routes in accordance with some embodiments. The policy function MAIN_RCF( ), for example, can be a policy function that is invoked at a point of application in a routing policy. The policy function RCF_HELPER( ) is defined with function parameters $PREF_TO_SET and $CLIST_NAME. In some embodiments, the function definition can specify the data type of each parameter. In the example shown in FIG. 4, for instance, the data type for parameter $PREF_TO_SET is INTTYPE and the data type for parameter $CLIST_NAME is COMMLISTTYPE. Data types can include general types such as integer, floating point number, characters, character strings, etc. In accordance with the present disclosure, data types can include data types that are specific to network routes. For example, BGP route data types can include data types that specify an AS path (autonomous system path), a community list, an Address Family Identifier (AFI), a Subsequent Address Family Identifier (SAFI), and so on.

Policy function MAIN_RCF( ) invokes policy function RCF_HELPER( ) at invocation points 402, 404 in the code for MAIN_RCF( ). At invocation point 402, RCF_HELPER( ) is invoked with arguments '20', and C_LIST_FOR_BIG_TAG, where C_LIST_FOR_BIG_TAG is a predefined BGP community list. At runtime, when RCF_HELPER( ) is invoked at invocation point 402, parameter $PREF_TO_SET will be set to '20' and parameter $CLIST_NAME will be set to the predefined list C_LIST_FOR_BIG_TAG. Execution of RCF_HELPER( ) will result in setting the global variable LOCAL_PREFERENCE to '20'; and the function will return TRUE or FALSE depending on whether the community values in the C_LIST_FOR_BIG_TAG community list match the community values in the COMMUNITY attribute of the path (route) being evaluated.

Likewise, at invocation point 404, RCF_HELPER( ) is invoked with arguments '30', and C_LIST_FOR_SMALL_TAG, where C_LIST_FOR_SMALL_TAG is a predefined BGP community list. At runtime, when RCF_HELPER( ) is invoked at invocation point 404, parameter $PREF_TO_SET will be set to '30' and parameter $CLIST_NAME will be set to the predefined list C_LIST_FOR_SMALL_TAG. Execution of RCF_HELPER( ) will result in setting the global variable LOCAL_PREFERENCE to '30'; and the function will return TRUE or FALSE depending on whether the C_LIST_FOR_SMALL_TAG community list matches the list of community values in the COMMUNITY attribute on the path.

It will be appreciated that RCF functions can be called with arguments that are not route attributes, but rather can be plain numbers (integers, floats, etc.), text, arbitrary data structures, and so on.

Figure 5:
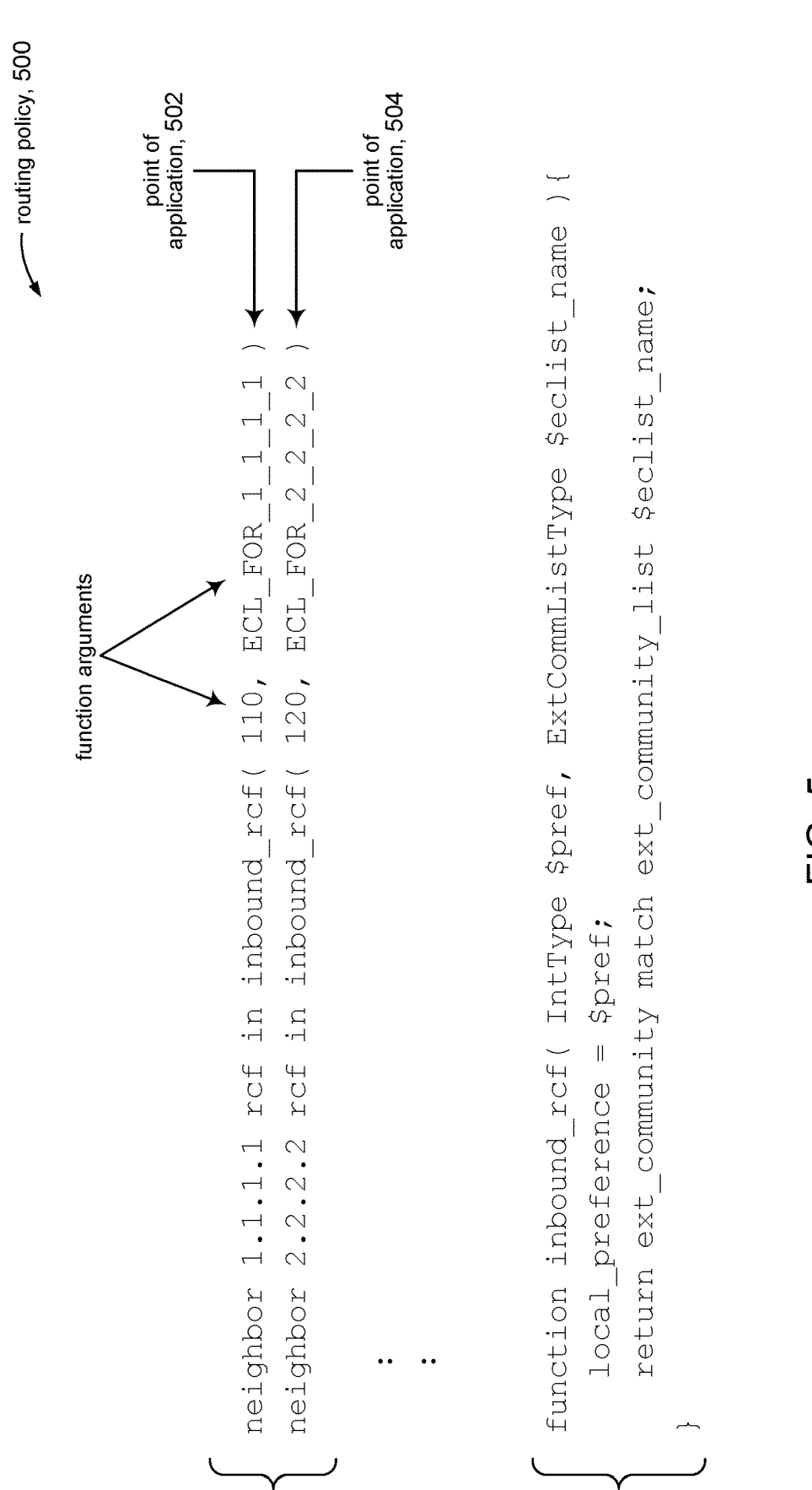
FIG. 5 is an illustrative example of a policy function at points of application in accordance with some embodiments.

FIG. 5 illustrates an example in accordance with some embodiments of invoking a policy function with arguments at points of application in a BGP routing policy 500. The routing policy in this example shows two points of application 502, 504 for the policy function INBOUND_RCF( ) with different arguments. The function definition 506 for INBOUND_RCF( ) includes two function parameters, $PREF and $ECLIST_NAME.

At runtime, when INBOUND_RCF( ) is invoked at point of application 502, parameter $PREF will be set to '110' and parameter $ECLIST_NAME will be set to ECL_FOR_1_1_1_1 (a globally defined BGP extended community list). Execution of INBOUND_RCF( ) will result in setting the global variable LOCAL_PREFERENCE to '110'; and the function will return TRUE or FALSE depending on whether the ECL_FOR_1_1_1_1 community list matches the list of community values in the EXT_COMMUNITY attribute on the path. Execution will continue at a point in the routing policy 500 that follows the point of application 502, which in our example is another point of application 504.

When INBOUND_RCF( ) is invoked at point of application 504, parameter $PREF will be set to '120' and parameter $ECLIST_NAME will be set to ECL_FOR_2_2_2_2 (a globally defined BGP extended community list). Execution of INBOUND_RCF( ) will result in setting the global variable LOCAL_PREFERENCE to '120'; and the function will return TRUE or FALSE depending on whether the ECL_FOR_2_2_2_2 community list matches the list of community values in the EXT_COMMUNITY attribute on the path. Execution will continue at a point in the routing policy 500 that follows the point of application 504.

Figure 6:
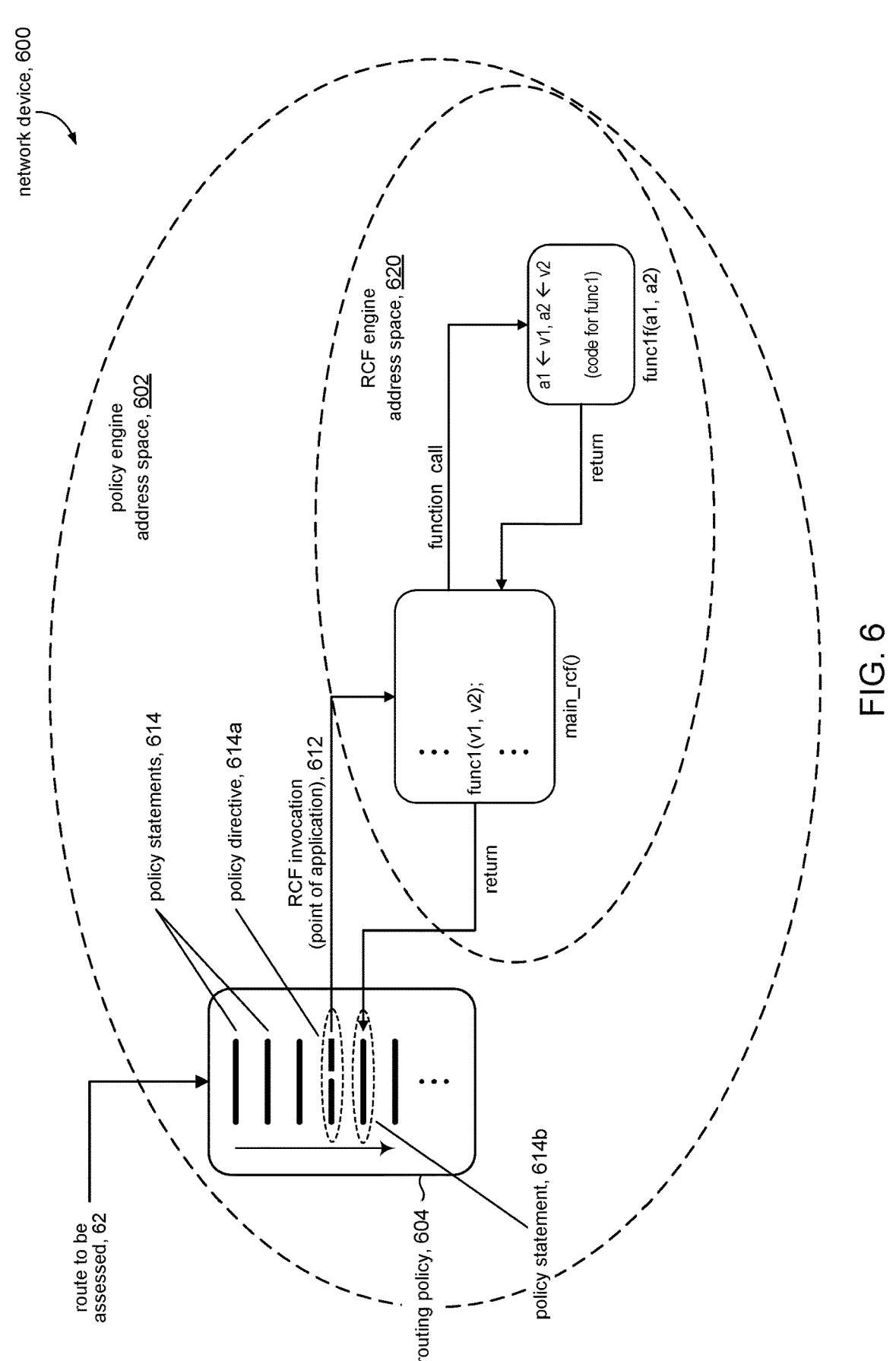
FIG. 6 represents an invocation flow in accordance with some embodiments.

FIG. 6 is a graphical representation of the invocation flow in a routing policy in accordance with the present disclosure. FIG. 6 shows route 62 being provided to routing policy 604 to be assessed. The route can come from a protocol agent (e.g., 204) executing on a network device 600, the route can be manually input by a user, and so on. Routing policy 604 comprises policy statements 614 (e.g., policy directives, routing configurations, etc.) which can be executed by a policy engine (e.g., 214) to assess route 62 for processing; e.g., program the route, drop the route, compute tags, etc. FIG. 6 shows for discussion purposes a policy directive 614a that includes a point of application 612 that invokes policy function MAIN_RCF( ).

The policy engine can be a process that executes on the network device. FIG. 6 shows that routing policy 604 executes in address space of the policy engine process 602. When execution of the routing policy reaches policy directive 614a, execution of the routing policy continues with (transfers to) the policy function specified at the point of application 612. In some embodiments, for example, the policy engine can execute the policy function within a suitable RCF execution environment (e.g., RCF engine 214a). More specifically, in some embodiments, the RCF execution environment can exist within the address space of policy engine 602. The policy function can then execute in an address space of the RCF execution environment 620.

In some embodiments, global variables in the RCF execution environment can be initialized from attributes associated with or information contained in the route to be assessed. For example, the community attribute of a route comprises a list of one or more community values. The global variable COMMUNITY (referenced above in connection with FIG. 4) can be initialized with the list of community values to be accessed by functions in the RCF execution environment. Other such global variables can be similarly initialized from information associated with the route; e.g., EXT_COMMUNITY for the external community attribute, etc.

In the illustrative example shown in FIG. 6, the policy function MAIN_RCF( ) is invoked at the point of application 612. If MAIN_RCF( ) encounters the call to FUNC1( ), then the RCF engine can continue execution within FUNC1( ). FIG. 6 shows that FUNC1( ) is called with two arguments v1, v2. In accordance with the present disclosure, the arguments are passed to FUNC1( ). FUNC1( ) in turn, is defined with parameters, A1, A2, which can be set to respective arguments v1, v2. When FUNC1( ) encounters a RETURN statement or otherwise terminates, then execution can return to MAIN_RCF( ). When MAIN_RCF( ) encounters a RETURN statement or otherwise terminates, then execution in the RCF engine can terminate and execution of the routing policy can transfer back to the point of application where execution of the routing policy can continue with a policy statement 614b that follows policy directive 614a.

Figure 7:
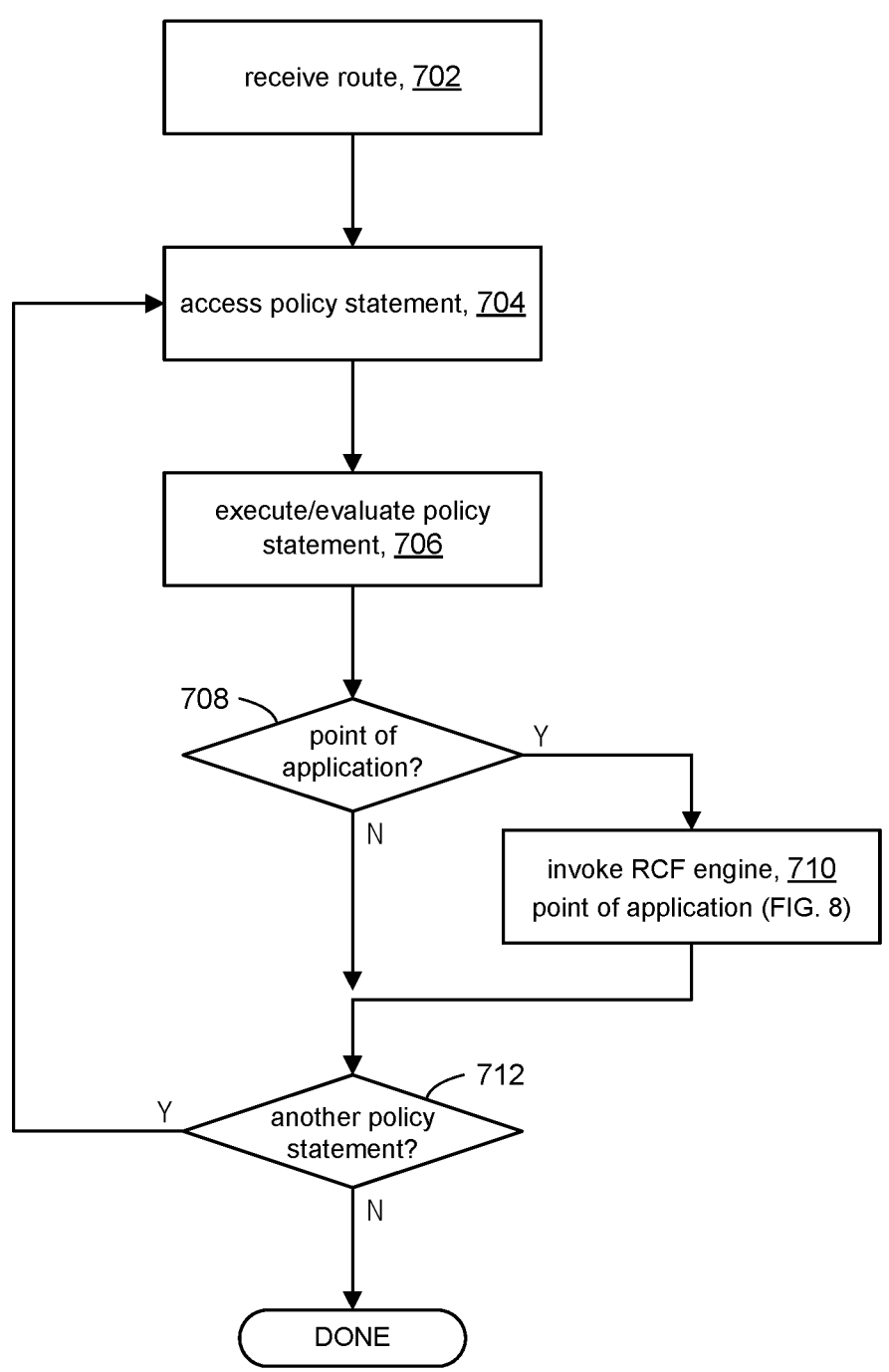
FIGS. 7 and 8 represent operations for processing a routing policy in accordance with the present disclosure.

Referring to FIG. 7, the discussion will now turn to a high-level description of processing in a network device (e.g., 100, FIG. 1) in accordance with the present disclosure for processing routes according to a routing policy, for example, by way of a protocol agent (e.g., 204, FIG. 2) executing a policy engine (e.g., 214). In some embodiments, for example, the network device can include one or more digital processing units, which when operated, can cause the network device to perform processing in accordance with FIG. 7. Depending on a given implementation, the processing may be performed entirely in the control plane or entirely in the data plane, or the processing may be divided between the control plane and the data plane. In some embodiments, the network device can include one or more processing units (circuits), which when operated, can cause the network device to perform processing in accordance with FIG. 7. Processing units (circuits) in the control plane, for example, can include general CPUs that operate by way of executing computer program code stored on a non-volatile computer readable storage medium (e.g., read-only memory); for example, CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 702, the policy engine (e.g., 214) executing on the network device can receive a route to be assessed. The route can originate from a protocol agent (e.g., 204), a user (e.g., 22), etc. In the BGP context, for example, a BGP neighbor can send a route to the network device to be assessed by the routing policy to determine whether to accept or drop the route. Alternatively, a route that is already programmed on the network device can be assessed by the routing policy to determine whether or not to advertise the route to its BGP neighbors.

At operation 704, the policy engine can access a policy statement from a routing policy (e.g., 302, FIG. 3). Policy statements include policy directives (e.g., 314, 316), routing configurations (e.g., 318), and so on.

At operation 706, the policy engine can execute or otherwise evaluate the policy statement.

At decision point 708, if the policy statement is a policy directive that includes a point of application (e.g., 614a, FIG. 6), then processing can proceed to operation 710 (see FIG. 8) to process the point of application in the policy directive. In some embodiments, for example, a point of application can be indicated by the key words "RCF IN", as shown in FIG. 3 for example. If the policy statement is a policy directive that does not include a point of application, then processing can proceed to decision point 712.

At operation 710, the policy engine can transfer execution to the policy function (e.g., MAIN_RCF( ), FIG. 6) referenced at the point of application. In some embodiments, for example, the policy engine can invoke an RCF engine (e.g., 214*a*) to create an execution environment within which to begin executing the policy function referenced at the point of application. Upon completion/termination of processing in the RCF engine, processing can continue to decision point 712.

At decision point 712, if there is another policy statement in the routing policy, then processing can proceed to operation 704. Otherwise, processing of the routing policy by the policy engine to assess the network route can be deemed complete. The routing policy may determine that the network route should be dropped, or the routing policy may permit the network route. The protocol agent can decide how to handle the route based on the assessment/determination made by the routing policy. Suppose the assessment on the network route is "PERMIT". Then, if the route was received from a BGP neighbor, the protocol agent can accept the route (e.g., to be programmed in a routing table), drop the route, or do something else with the route based on the assessment made by the policy engine. If the route was read out from a routing table, the protocol agent can advertise the route to BGP neighbors based on the assessment made by the policy engine.

Figure 8:
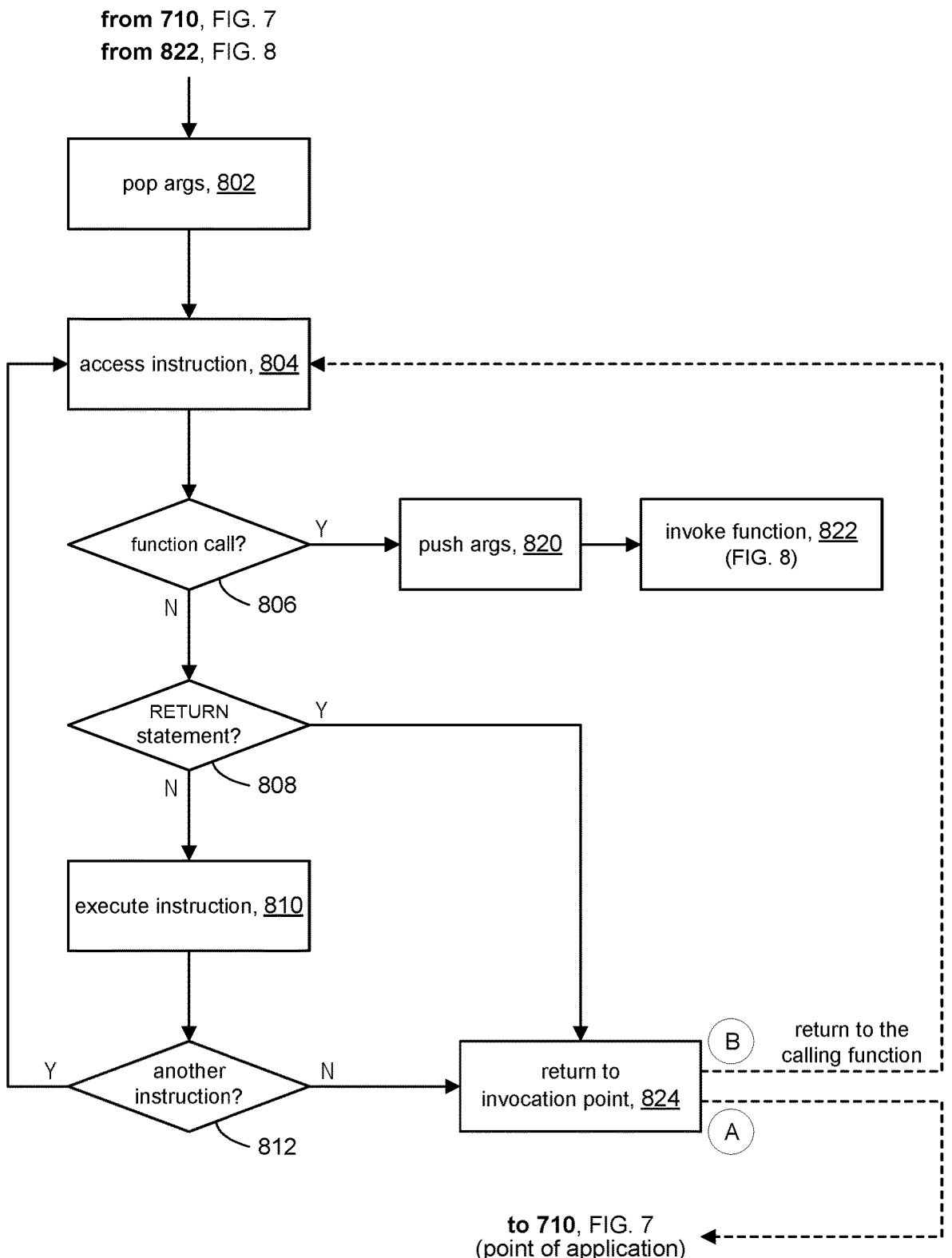

Referring to FIG. 8, the discussion will now turn to a high-level description of processing in a network device (e.g., 100, FIG. 1) to execute policy functions in accordance with the present disclosure, for example, by way of an RCF engine (e.g., 214*a*) executing in the address space of a policy engine. Depending on a given implementation, the processing may be performed entirely in the control plane or entirely in the data plane, or the processing may be divided between the control plane and the data plane. In some embodiments, the network device can include one or more processing units (circuits), which when operated, can cause the network device to perform processing in accordance with FIG. 8. Processing units (circuits) in the control plane, for example, can include general CPUs that operate by way of executing computer program code stored on a non-volatile computer readable storage medium (e.g., read-only memory); for example, CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 112*a*-112*p* in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

The processing in FIG. 8 represents the general flow for executing policy functions. As explained above, a policy function can be called (invoked) from a policy directive (e.g., 314, FIG. 3) at a point of application, in which case processing according to FIG. 8 can be initiated from operation 710 in FIG. 7. Alternatively, a policy function can be called from within another policy function (e.g., 320), in which case processing according to FIG. 8 can be initiated from operation 822 in a previous instance of FIG. 8.

At operation 802, if any arguments are passed to the called policy function, the RCF engine can assign the arguments to respective parameters of the called policy function. Referring to invocation point 402 in FIG. 4, for example, the policy function RCF_HELPER is called with the arguments '20' and C_LIST_FOR_BIG_TAG. The RCF engine can assign the arguments to respective parameters $PREF_TO_SET and $CLIST_NAME in the function definition for RCF_HELPER. In some embodiments, for example, the RCF engine can use a stack data structure to pass arguments to the policy function. The RCF engine can push the arguments onto the stack when the policy function is invoked. In the policy function itself, the RCF engine can pop the arguments off the stack and assign them to their respective parameters.

At operation 804, the RCF engine can access an instruction in the called policy function. When the policy function is invoked at a point of application in a routing policy (e.g., 314, FIG. 3) or via a function call from within another policy function (e.g., 320), the accessed instruction can be the first instruction in the called policy function. In the case of a return from a called function (operation 824) where execution returns to the calling function, the accessed instruction can be the instruction in the calling function that follows the invocation of the called function.

At decision point 806, if the instruction is a function call, then processing can continue at operation 820 to make the function call. If the instruction is not a function call, then processing can continue to decision point 808.

At decision point 808, if the instruction is a RETURN statement, then processing can continue at operation 824 to terminate execution in the policy function. If the instruction is not a RETURN statement, then processing can continue at operation 810.

At operation 810, the RCF engine can execute the instruction. Processing can continue at decision point 812 upon completing execution of the instruction.

At decision point 812, if there is another instruction in the called policy function, the RCF engine can proceed to operation 804 to access the next instruction. Otherwise, the RCF engine can continue at operation 824 to terminate execution in the policy function.

Invocation of Policy Function

At operation 820, if the function call includes any arguments, the RCF engine can pass those arguments to the called function. As noted above, in some embodiments, the RCF engine can use a stack data structure to pass arguments to the policy function. The RCF engine can push the arguments onto the stack as part of making the function call.

At operation 822, the RCF engine can transfer execution to the called function. Processing in the called function can proceed according to FIG. 8 starting at operation 802.

Termination of Policy Function

At operation 824, the RCF engine can return to the invocation point where the policy function was invoked to continue execution following the invocation point. Using FIG. 3 as an example, recall that a policy function can be called (invoked) via a policy directive (e.g., 314) at the point of application or from within another policy function (e.g., 320). In the case that the policy function was invoked via a policy directive (e.g., 314), then the invocation point would be the point of application in the policy directive, and processing can continue with the policy statement (e.g. policy directive 316) that follows the point of application. Path A in FIG. 8 represents the flow for this use case. In the case that the policy function was invoked from within another policy function (e.g., 320), then the invocation point is where the policy function was invoked in the calling function and execution can transfer back to that calling function and continue with the instruction in that calling function following the invocation point; path B in FIG. 8 represents the flow for this use case.

Placeholder Functions

The discussion will now turn to placeholder functions. Referring for a moment to FIG. 6, in some embodiments, execution of the routing policy can occur in different contexts. Policy statements, for example, can be executed by the policy engine and policy functions can be executed by the RCF engine. The policy function at the point of application in a policy directive is processed in the context of the policy engine. In some embodiments, the policy engine may not be configured to process function arguments in accordance with the present disclosure. As such, in some embodiments, when a policy function that has arguments is invoked at a point of application, the policy engine may not be able to pass those arguments to the policy function.

Figure 9:
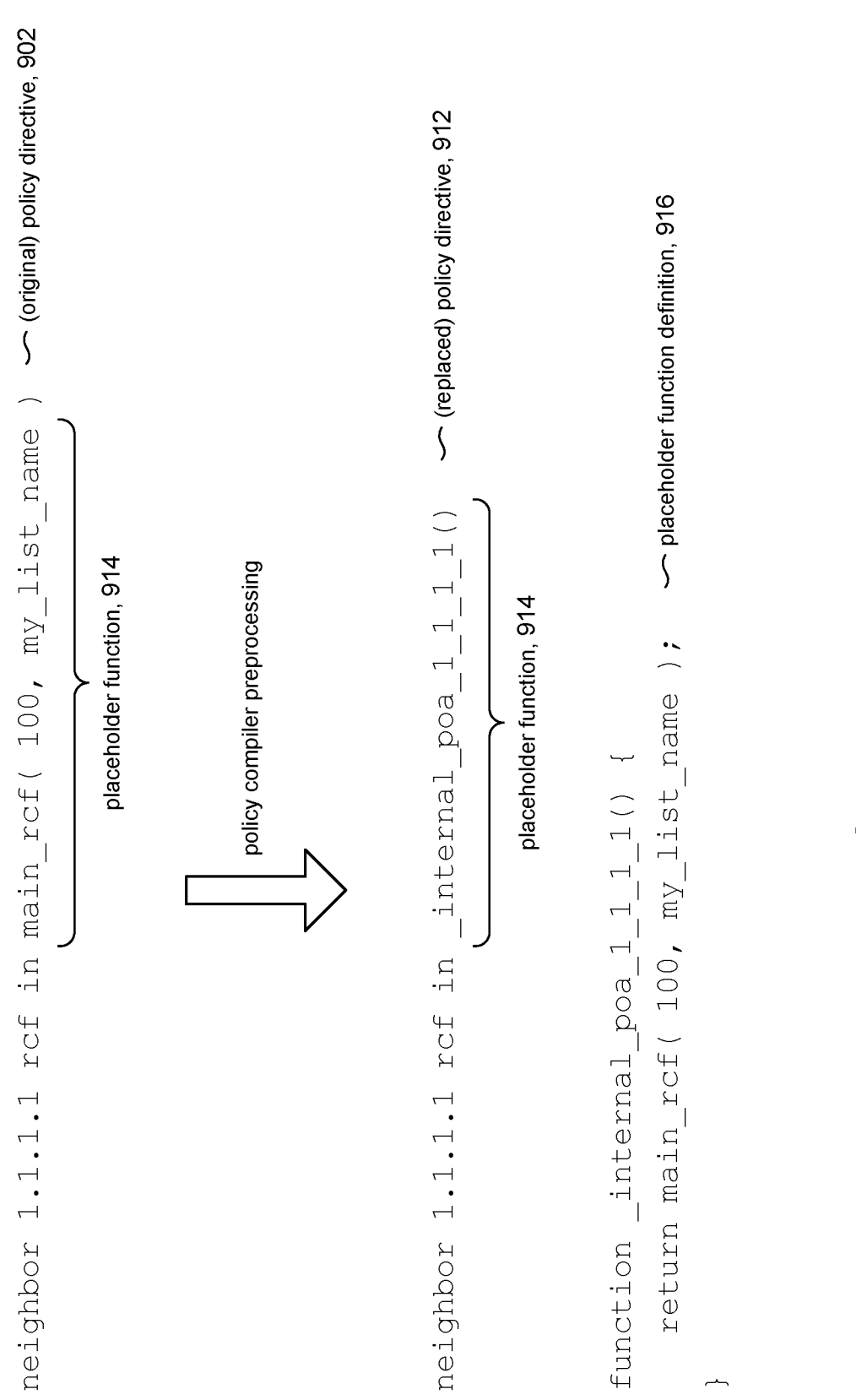
FIG. 9 illustrates the use of a placeholder function in accordance the present disclosure.

Referring to FIG. 9, in accordance with some embodiments of the present disclosure, the policy compiler (e.g., 202, FIG. 2) can be configured to perform preprocessing operations on the routing policy to replace policy functions at points of application in the routing policy that have function arguments with placeholder policy functions that do not have function arguments. Consider, for example, a policy directive 902. This policy directive is a point of application that invokes a policy function MAIN_RCF( ) with function arguments. The policy compiler can perform preprocessing operations to replace the original policy directive 902 with a replaced policy directive 912 that invokes a placeholder function 914 without function arguments. The preprocessing operations can further include generating a placeholder function definition 916 that invokes the original policy function MAIN_RCF( ) with its arguments. The name of the placeholder function (in our example_ INTERNAL_POA_1_1_1_1) can be generated according to any suitable algorithm. The policy compiler can then proceed with its compilation operations to generate translated statements (212*a*, FIG. 2) and compiled functions (212*b*). The policy engine can invoke the placeholder function at the point of application. Execution of the placeholder function occurs within the context of the RCF engine, and so when the placeholder function invokes MAIN_RCF( ), the RCF engine can pass the arguments to MAIN_RCF( ).

Further Examples

Features described above as well as those claimed below may be combined in various ways without departing from the scope hereof. The following examples illustrate some possible, non-limiting combinations:

(A1) A method in a network device for processing network routes, the method comprising: receiving a routing policy comprising a plurality of policy directives, at least one policy directive having a point of application comprising a function call to a first function, wherein the function call to the first function includes one or more function arguments; receiving a network route; assessing the network route by processing the policy directives in the routing policy, including executing the at least one policy directive, wherein executing the at least one policy directive includes: invoking the first function, wherein program execution transfers from executing the policy directive to executing program instructions of the first function, wherein the one or more function arguments in the function call to the first function are available to the program instructions of the first function; performing one or more operations in accordance with the program instructions of the first function using the one or more function arguments; and upon completing execution of the first function, returning program execution to a point in the routing policy following the point of application to continue processing the policy directives in the routing policy to assess the network route; and performing an action on the network route based on the assessed network route.

(A2) For the method denoted as (A1), the one or more arguments are network route attributes.

(A3) For the method denoted as any of (A1) through (A2), the network route is received from a neighbor network device, wherein the action includes programming the assessed network route in a routing table of the network device.

(A4) For the method denoted as any of (A1) through (A3), the network route is received from a routing table in the network device, wherein the action includes advertising the assessed network route to neighbor network devices.

(A5) For the method denoted as any of (A1) through (A4), the routing policy further comprises the program instructions that constitute the first function.

(A6) For the method denoted as any of (A1) through (A5), the program instructions that constitute the first function include a function call operation to invoke a second function, wherein the function call to the second function includes one or more function arguments.

(A7) The method denoted as any of (A1) through (A6), further comprising: invoking the second function, wherein program execution transfers from executing program instructions of the first function to executing program instructions of the second function, wherein the one or more function arguments of the function call to the second function are available to the program instructions of the second function; performing one or more operations in accordance with the program instructions of the second function, including using the one or more function arguments; and upon completing execution of the program instructions of the second function, returning program execution to the first function.

(A8) For the method denoted as any of (A1) through (A7), the routing policy further comprises the program instructions that constitute the second function.

(A9) For the method denoted as any of (A1) through (A8), processing the routing policy further includes replacing the function call to the first function at the point of application with a function call to a placeholder function that does not have any function arguments, wherein the placeholder function comprises a function call to the first function with the one or more function arguments, wherein invoking the first function includes invoking the placeholder function which in turn invokes the first function with the one or more function arguments.

(A10) For the method denoted as any of (A1) through (A9), the network route is a BGP (Border Gateway Protocol) route.

(B1) A network device comprising: one or more computer processors; and a computer-readable storage device comprising instructions for controlling at least one computer processor to: receive a network route; assess the network route by executing a routing policy that includes a function call to a function, wherein the function call includes at least one function argument to the function, wherein the computer processor: transfers program execution from executing the routing policy to executing program instructions of the function, wherein the function argument in the function call to the function is available to the program instructions of the function; performs one or more operations in accordance with the program instructions of the function using the arguments; and upon completing execution of the program instructions of the function, returns program execution to a point in the routing policy following the function call to continue executing the routing policy to assess the network route; and performing an action on the network route based on the assessed network route.

(B2) For the network device denoted as (B1), the network route is a BGP (Border Gateway Protocol) route.

(B3) For the network device denoted as any of (B1) through (B2), the function argument is a network route attribute.

(B4) For the network device denoted as any of (B1) through (B3), the network route is received from a neighbor network device, wherein the action includes programming the assessed network route in a routing table of the network device.

(B5) For the network device denoted as any of (B1) through (B4), the network route is received from a routing table in the network device, wherein the action includes advertising the assessed network route to neighbor network devices.

(B6) For the network device denoted as any of (B1) through (B5), he computer processor transfers program execution from executing the routing policy to executing program instructions of the function by: replacing the function call to the function with a function call to a placeholder function that does not have any function arguments, wherein the placeholder function comprises a function call to the function with the function argument; and invoking the placeholder function which in turn invokes the function with the one or more function arguments.

(C1) A network device comprising: one or more computer processors; and a computer-readable storage device comprising instructions that control the one or more computer processors to: receive a network route; assess the network route using a routing policy comprising a policy directive having a point of application comprising a function call to a first function, wherein the first function includes one or more function arguments, wherein assessing the network route includes executing the policy directive wherein the one or more computer processors: invoke the first function, to execute program instructions of the first function, wherein the one or more function arguments in the function call to the first function are available to the program instructions of the first function; perform one or more operations in accordance with the program instructions of the first function using the one or more function arguments; and upon completing execution of the program instructions of the first function, continue using the routing policy to assess the network route; and perform an action on the network route based on the assessed network route.

(C2) For the network device denoted as (C1), the one or more arguments are network route attributes.

(C3) For the network device denoted as any of (C1) through (C2), the network route is received from a neighbor network device, wherein the action includes programming the assessed network route in a routing table of the network device.

(C4) For the network device denoted as any of (C1) through (C3), the network route is received from a routing table in the network device, wherein the action includes advertising the assessed network route to neighbor network devices.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for processing network routes, the method comprising:
   receiving a routing policy comprising a plurality of policy directives, wherein one or more of the policy directives are expressed using a routing control programming language (referred to herein as "RCF"), at least one policy directive having a point of application comprising a function call to a first RCF function, wherein the function call to the first RCF function includes one or more function arguments;
   receiving a network route;
   assessing the network route by processing the policy directives in the routing policy, including executing the at least one policy directive, wherein executing the at least one policy directive includes:
      invoking the first RCF function, wherein program execution transfers from executing the policy directive to executing program instructions of the first RCF function, wherein the one or more function arguments in the function call to the first RCF function are available to the program instructions of the first RCF function;
      performing one or more operations in accordance with the program instructions of the first RCF function using the one or more function arguments; and
      upon completing execution of the first RCF function, returning program execution to a point in the routing policy following the point of application to continue processing the policy directives in the routing policy to assess the network route; and
   performing an action on the network route based on the assessed network route.

2. The method of claim 1, wherein the one or more arguments are network route attributes.

3. The method of claim 1, wherein the network route is received from a neighbor network device, wherein the action includes programming the assessed network route in a routing table of the network device.

4. The method of claim 1, wherein the network route is received from a routing table in the network device, wherein the action includes advertising the assessed network route to neighbor network devices.

5. The method of claim 1, wherein the routing policy further comprises the program instructions that constitute the first RCF function.

6. The method of claim 1, wherein the program instructions that constitute the first RCF function include a function call operation to invoke a second function, wherein the function call to the second function includes one or more function arguments.

7. The method of claim 6, further comprising:
   invoking the second function, wherein program execution transfers from executing program instructions of the first RCF function to executing program instructions of the second function, wherein the one or more function arguments of the function call to the second function are available to the program instructions of the second function;

performing one or more operations in accordance with the program instructions of the second function, including using the one or more function arguments; and upon completing execution of the program instructions of the second function, returning program execution to the first RCF function.

8. The method of claim 6, wherein the routing policy further comprises the program instructions that constitute the second function.

9. The method of claim 1, wherein processing the routing policy further includes replacing the function call to the first RCF function at the point of application with a function call to a placeholder function that does not have any function arguments, wherein the placeholder function comprises a function call to the first RCF function with the one or more function arguments, wherein invoking the first RCF function includes invoking the placeholder function which in turn invokes the first RCF function with the one or more function arguments.

10. The method of claim 1, wherein the network route is a BGP (Border Gateway Protocol) route.

11. A network device comprising:

one or more computer processors; and a computer-readable storage device comprising instructions for controlling at least one computer processor to:

receive a network route;

assess the network route by executing a routing policy, wherein the routing policy comprises one or more policy directives that are expressed using a routing control programming language (referred to herein as "RCF"), wherein the routing policy includes a function call to a function, wherein the function call includes at least one function argument to the function, wherein the computer processor:

transfers program execution from executing the routing policy to executing program instructions of the function, wherein the function argument in the function call to the function is available to the program instructions of the function;

performs one or more operations in accordance with the program instructions of the function using the arguments; and upon completing execution of the program instructions of the function, returns program execution to a point in the routing policy following the function call to continue executing the routing policy to assess the network route; and performing an action on the network route based on the assessed network route.

12. The network device of claim 11, wherein the network route is a BGP (Border Gateway Protocol) route.

13. The network device of claim 11, wherein the function argument is a network route attribute.

14. The network device of claim 11, wherein the network route is received from a neighbor network device, wherein the action includes programming the assessed network route in a routing table of the network device.

15. The network device of claim 11, wherein the network route is received from a routing table in the network device, wherein the action includes advertising the assessed network route to neighbor network devices.

16. The network device of claim 11, wherein the computer processor transfers program execution from executing the routing policy to executing program instructions of the function by:

replacing the function call to the function with a function call to a placeholder function that does not have any function arguments, wherein the placeholder function comprises a function call to the function with the function argument; and invoking the placeholder function which in turn invokes the function with the one or more function arguments.

17. A network device comprising:

one or more computer processors; and a computer-readable storage device comprising instructions that control the one or more computer processors to:

receive a network route;

assess the network route using a routing policy comprising one or more policy directives that are expressed using a routing control programming language (referred to herein as "RCF"), wherein the routing policy includes a function call to a first RCF function, wherein the first RCF function includes one or more function arguments, wherein assessing the network route includes executing the policy directive wherein the one or more computer processors:

invoke the first RCF function, to execute program instructions of the first RCF function, wherein the one or more function arguments in the function call to the first RCF function are available to the program instructions of the first RCF function;

perform one or more operations in accordance with the program instructions of the first RCF function using the one or more function arguments; and upon completing execution of the program instructions of the first RCF function, continue using the routing policy to assess the network route; and p1 perform an action on the network route based on the assessed network route.

18. The network device of claim 17, wherein the one or more arguments are network route attributes.

19. The network device of claim 17, wherein the network route is received from a neighbor network device, wherein the action includes programming the assessed network route in a routing table of the network device.

20. The network device of claim 17, wherein the network route is received from a routing table in the network device, wherein the action includes advertising the assessed network route to neighbor network devices.

* * * * *